United States Patent
Morimitsu et al.

(10) Patent No.: US 7,842,779 B2
(45) Date of Patent: Nov. 30, 2010

(54) PROCESS FOR PRODUCING GRANULAR CARBOXYLATED-POLYMER PARTICLE AND GRANULAR CARBOXYLATED-POLYMER PARTICLE

(75) Inventors: Yuichiro Morimitsu, Himeji (JP); Masatoyo Yoshinaka, Himeji (JP); Shinji Kobayashi, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 12/227,036

(22) PCT Filed: May 1, 2007

(86) PCT No.: PCT/JP2007/059324
§ 371 (c)(1),
(2), (4) Date: Feb. 5, 2009

(87) PCT Pub. No.: WO2007/132673
PCT Pub. Date: Nov. 22, 2007

(65) Prior Publication Data
US 2010/0029901 A1    Feb. 4, 2010

(30) Foreign Application Priority Data
May 12, 2006  (JP)  .............................. 2006-134372
Jun. 8, 2006   (JP)  .............................. 2006-159860

(51) Int. Cl.
C08F 6/00   (2006.01)
C08J 3/00   (2006.01)

(52) U.S. Cl. ................................. 528/502 R

(58) Field of Classification Search .............. 528/502 R
See application file for complete search history.

(56) References Cited

U.S. PATENT DOCUMENTS

| 2,923,629 A | 2/1960 | Bonomi |
| 2,958,679 A | 11/1960 | Jones |
| 3,915,921 A | 10/1975 | Schlatzer, Jr. |
| 4,996,274 A | 2/1991 | Hsu |
| 5,004,598 A | 4/1991 | Lochhead et al. |
| 5,342,911 A | 8/1994 | Bresciani |
| 5,629,395 A | 5/1997 | Fujikake et al. |
| 5,663,253 A | 9/1997 | Russo et al. |
| 7,132,479 B2 * | 11/2006 | Engelhardt et al. .......... 525/207 |

FOREIGN PATENT DOCUMENTS

| JP | 51-6190 | 1/1976 |
| JP | 52-2877 | 1/1977 |
| JP | 52-136262 | 11/1977 |
| JP | 58-84819 | 5/1983 |
| JP | 60-12361 | 4/1985 |
| JP | 3-143604 | 6/1991 |
| JP | 3-143605 | 6/1991 |
| JP | 5-39966 | 6/1993 |
| JP | 6-107720 | 4/1994 |
| JP | 2000-189794 | 7/2000 |
| JP | 2005-54151 | 3/2005 |
| WO | 03/016382 | 2/2003 |

* cited by examiner

*Primary Examiner*—Terressa M Boykin
(74) *Attorney, Agent, or Firm*—Hamre, Schumann, Mueller & Larson, P.C.

(57) ABSTRACT

An object of the invention is to provide a method for easily producing granular carboxyl group-containing polymer particles, which have a high bulk density and readily swell in water. The invention provides a method for producing a granular carboxyl group-containing polymer particle by producing a carboxyl group-containing polymer particle, preparing an aggregate of the carboxyl group-containing polymer particles by providing the carboxyl group-containing particles with moisture so that the carboxyl group-containing polymer particles absorb the moisture in an amount of 5 to 25% by weight and form the aggregate, drying the aggregate of the carboxyl group-containing polymer particles, and then grinding the dried aggregate.

6 Claims, No Drawings

PROCESS FOR PRODUCING GRANULAR CARBOXYLATED-POLYMER PARTICLE AND GRANULAR CARBOXYLATED-POLYMER PARTICLE

TECHNICAL FIELD

The present invention relates to a method for producing granular carboxyl group-containing polymer particles and granular carboxyl group-containing polymer particles obtained by that method. More specifically, the present invention relates to a method for producing granular carboxyl group-containing polymer particles, which are suitably useable as thickening agents for cosmetics and the like, and granular carboxyl group-containing polymer particles obtained by that method.

BACKGROUND ART

Known as carboxyl group-containing polymers to be used as thickening agents for cosmetics and the like, as humectants for cataplasms, and as suspension stabilizers for emulsions, suspensions and the like, among others, are crosslinking type carboxyl group-containing polymers and alkyl-modified carboxyl group-containing polymers, among others. Known as the crosslinking type carboxyl group-containing polymers are, for example, copolymers of an α,β-unsaturated carboxylic acid, such as acrylic acid, and a polyallyl ether (cf. Patent Document 1), copolymers of an α,β-unsaturated carboxylic acid and hexaallyl trimethylene trisulfone (cf. Patent Document 2), copolymers of an α,β-unsaturated carboxylic acid and glycidyl methacrylate or the like (cf. Patent Document 3), copolymers of an α,β-unsaturated carboxylic acid and pentaerythritol allyl ether (cf. Patent Document 4, Patent Document 5 and Patent Document 6), and copolymers of an α,β-unsaturated carboxylic acid, a (meth)acrylic acid ester and pentaerythritol allyl ether (cf. Patent Document 7 and Patent Document 8), among others.

Known as the alkyl-modified carboxyl group-containing polymers are, for example, copolymers of polyacrylic acid or (meth)acrylic acid and a (meth)acrylic acid alkyl ester, among others. More specifically, there are known copolymers obtained by reacting a specific amount of an olefinically unsaturated carboxylic acid monomer with a specific amount of a (meth)acrylic acid alkyl ester (the alkyl group containing 10 to 30 carbon atoms) (cf. Patent Document 9) and copolymers obtained by reacting an olefinically unsaturated carboxylic acid monomer with a (meth)acrylic acid alkyl ester (the alkyl group containing 8 to 30 carbon atoms) (cf. Patent Document 10).

In using the carboxyl group-containing polymer particle comprising a crosslinking type carboxyl group-containing polymer, an alkyl-modified carboxyl group-containing polymer or the like in the above-mentioned fields of application, it is first necessary to prepare a uniform aqueous dispersion of the carboxyl group-containing polymer particles and then neutralize the dispersion with an alkali to give a neutralized viscous liquid with a concentration of about 0.1 to 1% by weight. However, the above-mentioned carboxyl group-containing polymer particles are generally in the form of a fine powder and, therefore, undissolved lumps are readily formed on the occasion of dispersing the particles in water. There is a drawback that once undissolved lumps have been formed, a gel-like layer is formed on the surface of each lump and therefore the rate of permeation of water into the inside thereof is reduced and it becomes difficult to obtain a uniform aqueous dispersion.

Therefore, in preparing an aqueous dispersion of carboxyl group-containing polymer particles, a procedure which comprises gradually adding the carboxyl group-containing polymer particles in powder form to water with high-speed stirring and therefore is poor in production efficiency is required and, in some instances, a special dissolution apparatus is required for preventing the formation of undissolved lumps.

Furthermore, the carboxyl group-containing polymer particles mentioned above are in the form of a fine powder and are readily charged electrically and therefore cause heavy dusting. Therefore, the carboxyl group-containing polymer particles mentioned above are not only difficult to handle but also are disadvantageous from the working environment viewpoint. A further problem is that the carboxyl group-containing polymer particles in fine powder form have low bulk density and therefore cause increases in transportation cost and require an increased number of storage sites.

Therefore, the advent of a granular carboxyl group-containing polymer particle has been awaited.

In granulating a powder, a granulator is generally used. The granulators are broadly classified into three types, that is, mixing granulation, forced granulation and granulation utilizing heat.

As granulators for mixing granulation, there may be mentioned a fluidized bed granulator, a tumbling granulator and the like, which produce granules by causing a powder to float or flow by means of an air stream or stirring blade or by tumbling while uniformly spraying the powder with a liquid to serve as a binder. When an attempt is made to apply these granulators for mixing granulation to the carboxyl group-containing polymer particle, it is difficult to cause the carboxyl group-containing polymer particles to float or flow by means of an air stream or stirring blade or by tumbling since it is very small in particle diameter and low in bulk density. As for the liquid to be used as the binder, water is preferred from the viewpoint that the carboxyl group-containing polymer particle is mainly used in cosmetic preparations and the viewpoint of the environmental friendliness. However, when the floating or flowing carboxyl group-containing polymer particles are sprayed with water, the carboxyl group-containing polymer particles acquire tackiness and adhere to the granulator inside wall and binder-spraying nozzle or sticks to one another to form large undissolved lumps.

As granulators for forced granulation, there may be mentioned a compression molding granulator, an extrusion granulator and the like. As an example of granulation of the carboxyl group-containing polymer particle utilizing forced granulation, the method is known which comprises compressing the fine powder using a compression molding machine, followed by grinding (cf. Patent Document 11). However, this method has problems that, for example, the carboxyl group-containing polymer particles are excessively compressed by the pressure exerted by the compression molding machine and the resulting granular carboxyl croup-containing polymer particles become poor in swelling property in water.

As a granulator for granulation utilizing heat, there may be mentioned a spray dryer. However, this has problems that, for example, it is economically-disadvantaged due to the need to dilute the carboxyl group-containing polymer particles with water, an organic solvent or the like to a viscosity level at which the diluted product can be sprayed and, in addition, the granule obtained is not porous and therefore poor in solubility in water.

On the other hand, methods are known for granulation without using such granulators as mentioned above, for example, the method comprising bringing a polymer flocculant in fine powder form into contact with water vapor to thereby effect granulation (cf. Patent Document 12), the method comprising dispersing a water-soluble polymer in fine powder form in an organic solvent and then adding water to thereby effect granulation (cf. Patent Document 13) and the method comprising feeding a lubricant and water simultaneously and continuously to a water-soluble polymeric substance in fine powder form and grinding the thus-granulated gel bodies (cf. Patent Document 14). In the case of the carboxyl group-containing polymer particle, however, it is difficult to apply these methods because of such problems as (1) the problem that the carboxyl group-containing polymer particles, when brought into contact with water formed due to dew condensation of water vapor, swell with that water and the finally-obtained granule is not porous and therefore poor in solubility in water, in addition, the problem that, in the case of the method comprising allowing a powder to fall to thereby bring the same into contact with water vapor, it is difficult to allow the carboxyl group-containing polymer particles, which are poor in flowability, to fall uniformly and a large amount of dust may possibly be flung up on the occasion of allowing the powder to fall, (2) the problem that, on the occasion of adding water following dispersing in an organic solvent, the resulting hydrous gel forms undissolved lumps and (3) the problem that the granule contains an unnecessary lubricant depending on use application and is produced via a gel form, resulting in that the granule obtained is not porous and therefore poor in solubility in water.

Patent Document 1: U.S. Pat. No. 2,923,629
Patent Document 2: U.S. Pat. No. 2,958,679
Patent Document 3: Japanese Kokai Publication Sho-58-84819
Patent Document 4: U.S. Pat. No. 5,342,911
Patent Document 5: U.S. Pat. No. 5,663,253
Patent Document 6: U.S. Pat. No. 4,996,274
Patent Document 7: Japanese Kokoku Publication Hei-5-39966
Patent Document 8: Japanese Kokoku Publication Sho-60-12361
Patent Document 9: Japanese Kokai Publication Sho-51-6190
Patent Document 10: U.S. Pat. No. 5,004,598
Patent Document 11: International Publication WO 03/016382
Patent Document 12: Japanese Kokai Publication Sho-52-2877
Patent Document 13: Japanese Kokai Publication Sho-52-136262
Patent Document 14: Japanese Kokai Publication Hei-3-143605

DISCLOSURE OF INVENTION

Problems to be Solved by the Invention

It is an object of the present invention to provide a method for easily producing granular carboxyl group-containing polymer particles which have a high bulk density and readily swell in water.

Means for Solving the Problems

The present invention has been completed based on the finding that a granular carboxyl group-containing polymer particle can be obtained by causing carboxyl group-containing polymer particles to absorb moisture to a specific level of moisture content to give an aggregate, subsequently drying and grinding this aggregate. Thus, the present invention relates to the following items.

Item 1. A method for producing a granular carboxyl group-containing polymer particle, which comprises producing a carboxyl group-containing polymer particle, preparing an aggregate of the carboxyl group-containing polymer particles by causing the carboxyl group-containing polymer particles to absorb moisture to a moisture content of 5 to 25% by weight and drying the aggregate of the carboxyl group-containing polymer particles and then grinding the dried aggregate.

Item 2. The method for producing a granular carboxyl group-containing polymer particle according to item 1, wherein an $\alpha,\beta$-unsaturated carboxylic acid and a compound containing two or more ethylenically unsaturated groups are polymerized in an inert solvent in the presence of a radical polymerization initiator to give a crosslinking type carboxyl group-containing polymer particle in producing the carboxyl group-containing polymer particle.

Item 3. The method for producing a granular carboxyl group-containing polymer particle according to item 1, wherein an $\alpha,\beta$-unsaturated carboxylic acid and a (meth) acrylic acid alkyl ester containing an alkyl group of 10 to 30 carbon atoms are polymerized in an inert solvent in the presence of a radical polymerization initiator to give an alkyl-modified carboxyl group-containing polymer particle in producing the carboxyl group-containing polymer particle.

Item 4. The method for producing a granular carboxyl group-containing polymer particle according to item 1, 2 or 3, wherein the carboxyl group-containing polymer particles are maintained in an atmosphere having a temperature of 25 to 100° C. and a relative humidity of not lower than 30% but lower than 100% in preparing the aggregate of the carboxyl group-containing polymer particles.

Item 5. A granular carboxyl group-containing polymer particle obtained by the method for producing according to item 1, 2, 3 or 4, which has the following characteristics:

1) a median particle diameter of 300 to 800 μm,
2) a bulk density of not lower than 0.30 g/ml and
3) a time of not longer than 30 minutes required for all the granular carboxyl group-containing polymer particles to swell when being placed in standing water at 25° C. in a proportion of 0.5% by weight relative to water.

In the following, the present invention is described in detail.

The method for producing granular carboxyl group-containing polymer particles of the present invention comprises producing a carboxyl group-containing polymer particle.

Preferably used as the carboxyl group-containing polymer particle is a crosslinking type carboxyl group-containing polymer particle or an alkyl-modified carboxyl group-containing polymer particle.

The crosslinking type carboxyl group-containing polymer particle to be used in the practice of the present invention can be produced by polymerizing an $\alpha,\beta$-unsaturated carboxylic acid and a compound containing two or more ethylenically unsaturated groups in an inert solvent in the presence of a radical polymerization initiator.

The $\alpha,\beta$-unsaturated carboxylic acid to be used in producing the crosslinking type carboxyl group-containing polymer particle mentioned above is not particularly restricted but includes, among others, an $\alpha,\beta$-unsaturated carboxylic acid such as acrylic acid, methacrylic acid, crotonic acid, maleic acid, itaconic acid, fumaric acid; an $\alpha,\beta$-unsaturated carboxylic acid alkyl ester such as methyl acrylate, ethyl acrylate, octyl acrylate, lauryl acrylate, myristyl acrylate, behenyl acrylate, lauryl methacrylate, myristyl methacrylate, behenyl methacrylate. These may be used singly or two or more of them may be used in combination.

In the present invention, acrylic acid and methacrylic acid are collectively referred to as (meth)acrylic acid.

In producing the above-mentioned crosslinking type carboxyl group-containing polymer particle, the α,β-unsaturated carboxylic acid is used preferably in an amount of 6 to 25 parts by volume, more preferably 8 to 22 parts by volume, particularly preferably 13 to 20 parts by volume, relative to 100 parts by volume of the inert solvent to be specifically described later herein. When the amount used of the α,β-unsaturated carboxylic acid is smaller than 6 parts by volume, the neutralized viscous liquid prepared from the granular carboxyl group-containing polymer particles obtained may become poor in transparency. When the amount used of the α,β-unsaturated carboxylic acid is in excess of 25 parts by volume, the crosslinking type carboxyl group-containing polymer particles will precipitate out with the progress of the reaction, possibly making it difficult to perform uniform stirring and, in addition, the neutralized viscous liquid prepared from the granular carboxyl group-containing polymer particles obtained may become poor in surface smoothness.

In the present invention, the term "neutralized" in the phrase "neutralized viscous liquid" means that the liquid or solution has a pH of 6.5 to 7.5.

The above-mentioned compound containing two or more ethylenically unsaturated groups is not particularly restricted but includes, among others, di- or more substituted-acrylic acid esters of polyols such as ethylene glycol, propylene glycol, polyoxyethylene glycol, polyoxypropylene glycol, glycerol, polyglycerol, trimethylolpropane, pentaerythritol, saccharose and sorbitol; di- or more substituted-allyl ethers of such polyols as mentioned above; diallyl phthalate, triallyl phosphate, allyl methacrylate, tetrallyloxyethane, triallyl cyanurate, divinyl adipate, vinyl crotonate, 1,5-hexadiene and divinylbenzene. Among them, pentaerythritol allyl ether and polyallyl saccharose are preferred since they, even when used in a small proportion, can give a neutralized viscous liquid having a high thickening property and capable of providing emulsions, suspensions and the like with a high suspension stability.

The compound containing two or more ethylenically unsaturated groups is used preferably in an amount of 0.01 to 2 parts by weight, more preferably 0.3 to 1.5 parts by weight, relative to 100 parts by weight of the α,β-unsaturated carboxylic acid. When the amount used of the compound containing two or more ethylenically unsaturated groups is smaller than 0.01 parts by weight, the neutralized viscous liquid prepared from the granular carboxyl group-containing polymer particles obtained may show reduced viscosity. When the amount of the compound containing two or more ethylenically unsaturated groups is above 2 parts by weight, an insoluble gel may be readily formed in the neutralized viscous liquid prepared from the granular carboxyl group-containing polymer particles obtained.

The alkyl-modified carboxyl group-containing polymer particle to be used in the practice of the present invention can be produced by polymerizing an α,β-unsaturated carboxylic acid and a (meth)acrylic acid alkyl ester containing an alkyl group of 10 to 30 carbon atoms in an inert solvent in the presence of a radical polymerization initiator.

The α,β-unsaturated carboxylic acid to be used in producing the above-mentioned alkyl-modified carboxyl group-containing polymer particle is not particularly restricted but includes, among others, acrylic acid, methacrylic acid, crotonic acid, maleic acid, itaconic acid and fumaric acid. These may be used singly or two or more of them may be used in combination.

In producing the alkyl-modified carboxyl group-containing polymer particle mentioned above, the α,β-unsaturated carboxylic acid is used preferably in an amount of 6 to 25 parts by volume, more preferably 8 to 22 parts by volume, particularly preferably 13 to 20 parts by volume, relative to 100 parts by volume of the inert solvent to be specifically described later herein. When the amount used of the α,β-unsaturated carboxylic acid is smaller than 6 parts by volume, the neutralized viscous liquid prepared from the granular carboxyl group-containing polymer particles obtained may become poor in transparency. When the amount used of the α,β-unsaturated carboxylic acid is in excess of 25 parts by volume, the alkyl-modified carboxyl group-containing polymer particles will precipitate out with the progress of the reaction, possibly making it difficult to perform uniform stirring and, in addition, the neutralized viscous liquid prepared from the granular carboxyl group-containing polymer particles obtained may become poor in surface smoothness.

The (meth)acrylic acid alkyl ester containing an alkyl group of 10 to 30 carbon atoms, which is to be used in the practice of the present invention, is an ester derived from (meth)acrylic acid and a higher alcohol containing an alkyl group of 10 to 30 carbon atoms and, as examples thereof, there may be mentioned an ester derived from (meth)acrylic acid and stearyl alcohol, an ester derived from (meth)acrylic acid and eicosanol, an ester derived from (meth)acrylic acid and behenyl alcohol and an ester derived from (meth)acrylic acid and tetracosanol, among others. Among them, stearyl methacrylate, eicosanyl methacrylate, behenyl methacrylate and tetracosanyl methacrylate are preferably used since the neutralized viscous liquid prepared from the granular carboxyl group-containing polymer particles obtained is superior in viscosity characteristics and texture even in the presence of an electrolyte. As the (meth)acrylic acid alkyl ester containing an alkyl group of 10 to 30 carbon atoms, a commercial product such as Blenmer VMA 70 produced by NOF Corporation may also be used.

In the practice of the present invention, the (meth)acrylic acid alkyl ester containing an alkyl group of 10 to 30 carbon atoms is used preferably in an amount of 0.5 to 20 parts by weight, more preferably 1 to 10 parts by weight, relative to 100 parts by weight of the α,β-unsaturated carboxylic acid. When the (meth)acrylic acid alkyl ester containing an alkyl group of 10 to 30 carbon atoms is used in an amount smaller than 0.5 parts by weight relative to 100 parts by weight of the α,β-unsaturated carboxylic acid, the neutralized viscous liquid prepared from the granular carboxyl group-containing polymer particles obtained may be poor in transparency in the presence of an electrolyte and, when it is used in excess of 20 parts by weight, the granular carboxyl group-containing polymer particle obtained may be poor in solubility in water.

The above-mentioned radical polymerization initiator is not particularly restricted but includes, among others, α,α'-azobisisobutyronitrile, 2,2'-azobis-2,4-dimethylvaleronitrile, dimethyl 2,2'-azobisisobutyrate, benzoyl peroxide, lauroyl peroxide, cumene hydroperoxide and tert-butyl hydroperoxide.

The radical polymerization initiator is used preferably in an amount of 0.01 to 0.45 parts by weight, more preferably 0.01 to 0.35 parts by weight, relative to 100 parts by weight of the α,β-unsaturated carboxylic acid. When the radical polymerization initiator is used in an amount smaller than 0.01 parts by weight, the rate of reaction may become slow to cause an economic disadvantage. When the radical polymerization initiator is used in an amount exceeding 0.45 parts by weight, the neutralized viscous liquid prepared from the granular carboxyl group-containing polymer particles obtained may possibly become poor in surface smoothness.

In the present invention, the "inert solvent" refers to a solvent capable of dissolving the α,β-unsaturated carboxylic acid, capable of dissolving the compound containing two or more ethylenically unsaturated groups or the (meth)acrylic acid alkyl ester containing an alkyl group of 10 to 30 carbon atoms and but incapable of dissolving the carboxyl group-containing polymer particles obtained.

As such inert solvent, there may be mentioned, for example, normalpentane, normalhexane, normalheptane, normaloctane, isooctane, cyclopentane, methylcyclopentane, cyclohexane, methylcyclohexane, benzene, toluene, xylene, chlorobenzene, ethylene dichloride, ethyl acetate, isopropyl acetate, methyl ethyl ketone and methyl isobutyl ketone. These may be used singly or two or more of them may be used in combination. Among them, ethylene dichloride and normal hexane are preferred from the viewpoints of the quality stability and ready availability.

The atmosphere in which the α,β-unsaturated carboxylic acid and the compound containing two or more ethylenically unsaturated groups are polymerized or the α,β-unsaturated carboxylic acid and the (meth)acrylic acid alkyl ester containing an alkyl group of 10 to 30 carbon atoms are polymerized is preferably an inert gas atmosphere such as a nitrogen gas and argon gas atmosphere.

The reaction temperature is preferably 50 to 90° C., more preferably 55 to 75° C., from the viewpoint that the reaction solution is to be inhibited from increasing in viscosity and that the neutralized viscous liquid prepared from the granular carboxyl group-containing polymer particles obtained is to be improved in surface smoothness.

The reaction time cannot be absolutely specified since it depends on the reaction temperature, but it is generally 2 to 10 hours.

After completion of the reaction, the reaction mixture is heated to 80 to 130° C. to thereby distill off the inert solvent, whereupon the carboxyl group-containing polymer particle can be obtained in the form of a fine white powder. When the heating temperature is lower than 80° C., a long period of time may be required for drying and, when it is higher than 130° C., the neutralized viscous liquid prepared from the granular carboxyl group-containing polymer particles obtained may show deteriorated surface smoothness.

In the practice of the present invention, preparing an aggregate of the above-mentioned carboxyl group-containing polymer particles is carried out by causing the carboxyl group-containing polymer particles obtained in the above-mentioned process to absorb moisture to a moisture content of 5 to 25% by weight.

The moisture content on the occasion of forming the aggregate by causing the carboxyl group-containing polymer particles to absorb moisture is 5 to 25% by weight, preferably 5 to 18% by weight. When the moisture content is lower than 5% by weight, the effect of aggregating the carboxyl group-containing polymer particles is insignificant and sufficient level of aggregation may not be obtained. Conversely, when the moisture content of the carboxyl group-containing polymer particles is higher than 25% by weight, the aggregation is excessively promoted and therefore the grinding after drying becomes difficult and, in addition, the drawbacks that, for example, the time required for dissolution when dispersing in water becomes prolonged are presented.

In the present description, the "moisture content" refers to the percentage of the subtracted weight, which is determined by drying the carboxyl group-containing polymer particle, to the weight thereof before drying. More specifically, 2 g of the carboxyl group-containing polymer particle is dried by heating to 105° C. for 3 hours and the percentage is calculated from the weight before drying and that after drying, as follows.

$$\text{Moisture content}(\% \text{ by weight}) = (2-X)/2 \times 100$$

(In the above formula, X is the weight (g) after drying by heating.)

In the practice of the invention, the method for causing the carboxyl group-containing polymer particles to absorb moisture to a moisture content of 5 to 25% by weight is not particularly restricted but includes, for example, the method comprising spraying the carboxyl group-containing polymer particles with fine drops of water, the method comprising maintaining the carboxyl group-containing polymer particles in a specific atmosphere and the like. In particular, the method comprising maintaining the carboxyl group-containing polymer particles in an atmosphere at a temperature of 25 to 100° C., preferably 30 to 90° C., and a relative humidity of not lower than 30% but lower than 100%, preferably not lower than 40% but lower than 100% is preferably used. When the maintaining temperature is lower than 25° C., the time required for causing the carboxyl group-containing polymer particles to aggregate may be prolonged. When the maintaining temperature exceeds 100° C., it is not preferable since energy is required in large quantities. When the relative humidity is lower than 30%, the time required for causing the carboxyl group-containing polymer particles to aggregate may be prolonged. When the relative humidity is 100%, it is not preferable since water is formed as a result of dew condensation and the carboxyl group-containing polymer particles swell in that water, resulting in that the finally-obtained granule is not porous and therefore poor in solubility in water.

The retention time cannot be absolutely specified since the state of aggregation varies depending on the moisture content attained at the temperature and relative humidity employed, and it is not particularly restricted provided that the carboxyl group-containing polymer particles can be retained for a period necessary for sufficient aggregation thereof. For example, under such conditions as 30° C. and relative humidity of 75%, it is preferable to retain a long period such as about 2 to 4 hours to attain high moisture content such as about 15 to 20% by weight. On the other hand, under such conditions as 80° C. and relative humidity of 80%, a short period of retention such as about 1 to 5 minutes may be employed since satisfactory aggregates can be obtained even at low moisture content such as about 5 to 10% by weight.

The method for maintaining the carboxyl group-containing polymer particles under such specific temperature and moisture conditions as mentioned above is not particularly restricted but includes, for example, the method comprising allowing the carboxyl group-containing polymer particles to stand into a thermo-hygrostat capable of being precisely controlled with regard to the space temperature and humidity, in which the space containing the carboxyl group-containing polymer particles is maintained at a uniform humidity without forming dew condensation due to change of temperature, in the state of a layer having such a thickness that they can absorb moisture uniformly. The term "stand" as used herein indicates that the carboxyl group-containing polymer particles are not in a flowing state. Thus, the case where the carboxyl group-containing polymer particles are moved in the thermo-hygrostat by means of an apparatus such as a belt conveyor without flowing thereof is also regarded as a case of standing.

When the carboxyl group-containing polymer particles are caused to absorb moisture to a moisture content of 5 to 25% by weight in the manner mentioned above, the particles are joined together, with water as a binder, to form aggregates.

The method for producing granular carboxyl group-containing polymer particles of the present invention comprises drying the obtained aggregate of the carboxyl group-containing polymer particles and then grinding the dried aggregate.

By drying and grinding the aggregate, the granular carboxyl group-containing polymer particles of the present invention can be obtained.

The drying apparatus to be used in the above drying is not particularly restricted but may be, for example, an air blowing dryer or an agitated trough dryer. The drying temperature is preferably 80 to 130° C., more preferably 90 to 110° C. When the drying temperature is lower than 80° C., a prolonged drying time may be required. When the drying temperature exceeds 130° C., the solubility of the granular carboxyl group-containing polymer particle to water may be impaired. The moisture content after drying is preferably lower than 5% by weight from the viewpoint that the fluidity after grinding is to be secured and that the granular carboxyl group-containing polymer particles are not to form undissolved lumps during a long period of storage.

The grinding apparatus to be used in the above grinding is not particularly restricted but may be conventionally-used grinding machines such as a pin mill type grinder, a hammer mill type grinder and a jet mill type grinder.

In these manners, the granular carboxyl group-containing polymer particle of the present invention can be obtained and, further, it is also possible to attain a desired median particle diameter by removing coarser particles by classification using a sieve with a desired mesh size.

The granular carboxyl group-containing polymer particle obtained by the method for producing of the present invention preferably has the following characteristics.

1) A median particle diameter of 300 to 800 μm,

2) A bulk density of not lower than 0.30 g/ml and

3) A time of not longer than 30 minutes required for all the granular carboxyl group-containing polymer particles to swell when being placed in standing water at 25° C. in a proportion of 0.5% by weight relative to water.

The granular carboxyl group-containing polymer particle of the present invention preferably has a median particle diameter of 300 to 800 μm, more preferably 400 to 600 μm. When the median particle diameter is smaller than 300 μm, dust may be readily flung up at the time of use and, in addition, on the occasion of adding the granular carboxyl group-containing polymer particles to standing water at 25° C. in the proportion of, for example, 0.5% by weight relative to water, undissolved lumps may be readily formed and the time required for all polymer particles to swell may sometimes exceed 30 minutes. Conversely, when the median particle diameter exceeds 800 μm, the handling thereof becomes easy but the time required for all polymer particles to swell in water may be a long period and sometimes exceed 30 minutes.

In the present invention, the term "median particle diameter" refers to the particle diameter corresponding to the mesh size of the sieve taking on granular carboxyl group-containing polymer particles, of which weight is added up resulting that the accumulated weight obtained by classifying the particles with the series of sieves and consecutively adding up the weights of the particles remaining on each sieve arrives at 50% by weight of the total weight of the particles. More specifically, seven standard sieves according to JIS-Z-8801-1982 (850 μm, 500 μm, 355 μm, 300 μm, 250 μm, 180 μm and 106 μm in mesh size) and a receiving pan are prepared, the sieves are stacked up in the order as mentioned above, from top (largest mesh size) to bottom (smallest mesh size), 100 g of the granular carboxyl group-containing polymer particle is placed on the sieve largest in mesh size, sieving is carried out by shaking the sieves using a Ro-Tap sieve shaker for 10 minutes, the particles remaining on each sieve are then weighed, and the mean particle diameter is calculated as the particle diameter corresponding to the mesh size of the sieve taking on particles, of which weight is added up resulting that the accumulated weight obtained by consecutively adding up the weights of the particles remaining arrives at 50% by weight of the total weight of the particles, as follows:

$$\text{Median particle diameter}(\mu m) = (50-A)/(C-A) \times (D-B) + B$$

In the above formula, A is the accumulated value (g) obtained by consecutively adding up the weights of the granular carboxyl group-containing polymer particles remaining on the sieves in order of decreasing mesh size from the largest one until the accumulated weight arrives at a level lower than 50% by weight but closest to 50% by weight, and C is the accumulated value (g) obtained by consecutively adding up the weights of the particles remaining on the sieves in order of decreasing mesh size from the largest one until the accumulated weight arrives at a level higher than 50% by weight but closest to 50% by weight. D is the mesh size (μm) of the sieve smallest in mesh size as involved in the calculation of the above-mentioned accumulated value A, and B is the mesh size (μm) of the sieve smallest in mesh size as involved in the calculation of the above-mentioned accumulated value C.

The granular carboxyl group-containing polymer particles of the present invention preferably have a bulk density of not lower than 0.30 g/ml, more preferably 0.30 to 0.60 g/ml, particularly preferably 0.35 to 0.55 g/ml. When the bulk density is lower than 0.30 g/ml, the bulk density cannot be said to be significantly higher as compared with the prior art carboxyl group-containing polymer particles and therefore such problems as the increase in transportation cost and the necessity of a large number of storage sites cannot be solved.

In the present invention, the "bulk density" refers to the ratio of the weight of the granular carboxyl group-containing polymer particles to the volume of the polymer particles having that weight. More specifically, it is the value obtained by pouring 10 g of the polymer particle into an empty 50 ml measuring cylinder from a position 5 cm above that cylinder while taking a time within 20 seconds, measuring the volume (ml) of the space occupied by the polymer particles and dividing the weight of 10 g of the polymer particle by the volume (ml) of the space occupied by the polymer particles.

The granular carboxyl group-containing polymer particle of the present invention preferably behaves as follows. When the polymer particles are placed in standing water at 25° C. in a proportion of 0.5% by weight relative to water and the subsequent state of swelling of the polymer particles is observed with eyes, the time required for all the polymer particles to swell is preferably not longer than 30 minutes, more preferably 30 minutes to 1 minute. When the time required for all polymer particles to swell exceeds 30 minutes, it is not preferable since the swelling property cannot be said to be significantly better as compared with the prior art carboxyl group-containing polymer particles.

EFFECTS OF THE INVENTION

The method for producing of the present invention makes it possible to obtain granular carboxyl group-containing polymer particles which hardly form undissolved lumps, have an excellent solubility in water, hardly cause dusting and are thus superior in handleability as compared with carboxyl group-containing polymer particles in fine powder form. By dissolving the granular carboxyl group-containing polymer particles obtained by the method for producing of the present invention in water and then neutralizing the solution with an alkali such as sodium hydroxide and triethanolamine, it is possible to obtain a neutralized viscous liquid excellent in surface smoothness, thickening property and transparency in a short period of time.

BEST MODES FOR CARRYING OUT THE INVENTION

The following examples and comparative examples illustrate the present invention more specifically. These examples are, however, by no means limitative of the scope of the present invention.

Example 1

A 500 ml four-necked flask equipped with a stirrer, thermometer, nitrogen inlet tube and condenser was charged with 45 g (42.9 ml) of acrylic acid, 0.24 g of pentaerythritol allyl ether, 0.153 g of $\alpha,\alpha'$-azobisisobutyronitrile and 150 g (223.9 ml) of normalhexane, followed by uniform stirring for mixing up. Thereafter, for removing the oxygen present in the reaction vessel upper space, raw materials and solvent, nitrogen gas was blown into the solution. Then, while the temperature was maintained at 60 to 65° C., the reaction was allowed to proceed in a nitrogen atmosphere for 4 hours.

After completion of the reaction, the slurry formed was heated to 90° C. to distill off the normalhexane, and the residue was further dried at 110° C. under reduced pressure (10 mm Hg) for 8 hours, whereupon 41 g of the crosslinking type carboxyl group-containing polymer particle was obtained as a fine white powder.

The crosslinking type carboxyl group-containing polymer particles obtained were spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 30° C. and a relative humidity of 75% for 3 hours, whereupon a moisture content of 16% by weight was attained. The resulting product was dried at 80° C. for 2 hours and then ground using a pin mill type grinder (trade name: Fine Impact Mill, manufactured by Hosokawa Micron Corporation), and the thus-obtained granular crosslinking type carboxyl group-containing polymer particles were classified using a sieve with a mesh size of 1000 μm, whereby 38 g of the granular crosslinking type carboxyl group-containing polymer particle as adjusted in particle size was obtained.

For the thus-obtained granular crosslinking type carboxyl group-containing polymer particle, the median particle diameter, bulk density and swelling time were measured. The swelling time was evaluated by the method mentioned below. The results thus obtained are shown in Table 1.

[Evaluation Method]

150 g of water is placed in a 200 ml beaker and the water temperature is adjusted to 25° C. While this is in a standing-still state, 0.75 g of the granular crosslinking type carboxyl group-containing polymer particle is fed into the water, and the time required for all the polymer particles to swell to the core thereof is measured. The judgment about the time of arrival of the granular crosslinking type carboxyl group-containing polymer particles at the state of swelling in water is made by observing with eyes whether or not the polymer particles, which are white when being dried, become white and semitransparent as a result of swelling in water.

Example 2

41 g of the crosslinking type carboxyl group-containing polymer particle obtained in the same manner as in Example 1 was spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 50° C. and a relative humidity of 80% for 15 minutes, whereupon a moisture content of 15% by weight was attained. The resulting product was dried at 80° C. for 2 hours and then ground using a pin mill type grinder (trade name: Fine Impact Mill, product of Hosokawa Micron Corporation), and the thus-obtained granular crosslinking type carboxyl group-containing polymer particles were classified using a sieve with a mesh size of 1000 μm, whereby 38 g of the granular crosslinking type carboxyl group-containing polymer particle as adjusted in particle size was obtained.

For the thus-obtained granular crosslinking type carboxyl group-containing polymer particle, the median particle diameter, bulk density and swelling time were measured. The results obtained are shown in Table 1.

Example 3

41 g of the crosslinking type carboxyl group-containing polymer particle obtained in the same manner as in Example 1 was spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 80° C. and a relative humidity of 80% for 1 minute, whereupon a moisture content of 7% by weight was attained. The resulting product was dried at 80° C. for 2 hours and then ground using a pin mill type grinder (trade name: Fine Impact Mill, manufactured by Hosokawa Micron Corporation), and the thus-obtained granular crosslinking type carboxyl group-containing polymer particles were classified using a sieve with a mesh size of 1000 μm, whereby 38 g of the granular crosslinking type carboxyl group-containing polymer particle as adjusted in particle size was obtained.

For the thus-obtained granular crosslinking type carboxyl group-containing polymer particle, the median particle diameter, bulk density and swelling time were measured. The results obtained are shown in Table 1.

Comparative Example 1

41 g of the crosslinking type carboxyl group-containing polymer particle obtained in the same manner as in Example 1 was spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 30° C.

and a relative humidity of 20% for 360 minutes, whereupon a moisture content of 3% by weight was attained. The resulting product was dried at 80° C. for 2 hours and then ground using a pin mill type grinder (trade name: Fine Impact Mill, manufactured by Hosokawa Micron Corporation), and the thus-obtained granular crosslinking type carboxyl group-containing polymer particles were classified using a sieve with a mesh size of 1000 μm, whereby 40 g of the granular crosslinking type carboxyl group-containing polymer particle as adjusted in particle size was obtained.

For the thus-obtained granular cross linking type carboxyl group-containing polymer particle, the median particle diameter, bulk density and swelling time were measured. The results obtained are shown in Table 1.

Comparative Example 2

41 g of the crosslinking type carboxyl group-containing polymer particle obtained in the same manner as in Example 1 was spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 30° C. and a relative humidity of 75% for 10 minutes, whereupon a moisture content of 4% by weight was attained. The resulting product was dried at 80° C. for 2 hours and then ground using a pin mill type grinder (trade name: Fine Impact Mill, manufactured by Hosokawa Micron Corporation), and the thus-obtained granular crosslinking type carboxyl group-containing polymer particles were classified using a sieve with a mesh size of 1000 μm, whereby 40 g of the granular crosslinking type carboxyl group-containing polymer particle as adjusted in particle size was obtained.

For the thus-obtained granular crosslinking type carboxyl group-containing polymer particle, the median particle diameter, bulk density and swelling time were measured. The results obtained are shown in Table 1.

Comparative Example 3

41 g of the crosslinking type carboxyl group-containing polymer particle obtained in the same manner as in Example 1 was spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 30° C. and a relative humidity of 90% for 180 minutes, whereupon a moisture content of 29% by weight was attained. The resulting product was dried at 80° C. for 2 hours and then ground using a pin mill type grinder (trade name: Fine Impact Mill, manufactured by Hosokawa Micron Corporation), and the thus-obtained granular crosslinking type carboxyl group-containing polymer particles were classified using a sieve with a mesh size of 1000 μm, whereby 35 g of the granular crosslinking type carboxyl group-containing polymer particle as adjusted in particle size was obtained.

For the thus-obtained granular crosslinking type carboxyl group-containing polymer particle, the median particle diameter, bulk density and swelling time were measured. The results obtained are shown in Table 1.

Comparative Example 4

15 kg of the crosslinking type carboxyl group-containing polymer particle obtained in the same manner as in Example 1 was granulated in the manner of compression molding granulation. The compression molding apparatus used was Pharma Impactor (model: CS-25, manufactured by Hosokawa Micron Corporation) The particles were compression-molded by compression between two rolls (roll diameter: 230 mm, roll distance: 1.2 mm, number of roll revolutions: 5 rpm, compression molding pressure: 0.15 T/cm$^2$). The subsequent grinding (trade name: Fine Impact Mill, manufactured by Hosokawa Micron Corporation) and classification gave 13.6 kg of the compression-molded granular crosslinking type carboxyl group-containing polymer particle.

For the thus-obtained compression-molded granular crosslinking type carboxyl group-containing polymer particle, the median particle diameter, bulk density and swelling time were measured. The results obtained are shown in Table 2.

Reference Example 1

For the crosslinking type carboxyl-group containing polymer particle in the form of a fine white powder as obtained in the same manner as in Example 1, the median particle diameter, bulk density and swelling time were measured. The results obtained are shown in Table 1.

TABLE 1

|  | Example1 | Example2 | Example3 | Comparative Example1 | Comparative Example2 | Comparative Example3 | Reference Example1 |
|---|---|---|---|---|---|---|---|
| Temperature | 30° C. | 50° C. | 80° C. | 30° C. | 30° C. | 30° C. | — |
| Humidity | 75% RH | 80% RH | 80% RH | 20% RH | 75% RH | 90% RH | — |
| Time for standing in thermo-hygrostat | 180 min | 15 min | 1 min | 360 min | 10 min | 180 min | — |
| Moisture content after standing | 16% by weight | 15% by weight | 7% by weight | 3% by weight | 4% by weightt | 29% by weight | — |
| Median particle diameter | 520 μm | 530 μm | 550 μm | <106 μm | <106 μm | 590 μm | 5-10 μm |
| Bulk density | 0.50 g/ml | 0.51 g/ml | 0.51 g/ml | 0.15 g/ml | 0.15 g/ml | 0.55 g/ml | 0.12 g/ml |
| swelling time | 15 min | 14 min | 16 min | ≧120 min | ≧120 min | 90 min | ≧120 min |

TABLE 2

| Method for granulating | Example 1 Method of present invention | Comparative Example 4 Compression molding |
|---|---|---|
| Median particle diameter | 520 μm | 550 μm |
| Bulk density | 0.50 g/ml | 0.41 g/ml |
| swelling time | 15 min | ≧120 min |

The results shown in Table 1 and Table 2 indicate that the granular crosslinking type carboxyl group-containing polymer particles as obtained by the method for producing of the present invention have a high bulk density and swell in water in a short period of time.

Example 4

A 500 ml four-necked flask equipped with a stirrer, thermometer, nitrogen inlet tube and condenser was charged with 45 g (42.9 ml) of acrylic acid, 0.68 g of Blenmer VMA70 (produced by NOF Corporation; a mixture of 10 to 20 parts by weight of stearyl methacrylate, 10 to 20 parts by weight of eicosanyl methacrylate, 59 to 80 parts by weight of behenyl methacrylate and at most 1 part by weight of tetracosanyl methacrylate) as the (meth)acrylic acid alkyl ester containing an alkyl group of 10 to 30 carbon atoms, 0.153 g of α,α'-azobisisobutyronitrile and 150 g (223.9 ml) of normalhexane, followed by uniform stirring for mixing up. Thereafter, for removing the oxygen present in the reaction vessel upper space, raw materials and solvent, nitrogen gas was blown into the solution. Then, while the temperature was maintained at 60 to 65° C., the reaction was allowed to proceed in a nitrogen atmosphere for 4 hours.

After completion of the reaction, the slurry formed was heated to 90° C. to distill off the normalhexane, and the residue was further dried at 110° C. under reduced pressure (10 mm Hg) for 8 hours, whereupon 42 g of the alkyl-modified carboxyl group-containing polymer particle was obtained as a fine white powder.

The alkyl-modified carboxyl group-containing polymer particles obtained were spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 30° C. and a relative humidity of 75% for 3 hours, whereupon a moisture content of 16% by weight was attained. The resulting product was dried at 80° C. for 2 hours and then ground using a pin mill type grinder (trade name: Fine Impact Mill, manufactured by Hosokawa Micron Corporation), and the thus-obtained granular alkyl-modified carboxyl group-containing polymer particles were classified using a sieve with a mesh size of 1000 μm to remove coarser particles, whereby 39 g of the granular alkyl-modified carboxyl group-containing polymer particle as adjusted in particle size was obtained.

For the thus-obtained granular alkyl-modified carboxyl group-containing polymer particle, the median particle diameter, bulk density and swelling time were measured. The swelling time was evaluated by the method mentioned below. The results thus obtained are shown in Table 3.

[Evaluation Method]

150 g of water is placed in a 200 ml beaker and the water temperature is adjusted to 25° C. While this is in a standing-still state, 0.75 g of the granular alkyl-modified carboxyl group-containing polymer particle is fed into the water, and the time required for all the polymer particles to swell to the core thereof is measured. The judgment about the time of arrival of the granular alkyl-modified carboxyl group-containing polymer particles at the state of swelling in water is made by observing with eyes whether or not the polymer particles, which are white when being dried, become white and semitransparent as a result of swelling in water.

Example 5

41 g of the alkyl-modified carboxyl group-containing polymer particle in the form of a fine white powder as obtained in the same manner as in Example 4 was spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 50° C. and a relative humidity of 80% for 15 minutes, whereupon a moisture content of 14% by weight was attained. The resulting product was dried at 80° C. for 2 hours and then ground using a pin mill type grinder (trade name: Fine Impact Mill, manufactured by Hosokawa Micron Corporation), and the thus-obtained granular alkyl-modified carboxyl group-containing polymer particles were classified using a sieve with a mesh size of 1000 μm to remove coarser particles, whereby 39 g of the granular alkyl-modified carboxyl group-containing polymer particle as adjusted in particle size was obtained.

For the thus-obtained granular alkyl-modified carboxyl group-containing polymer particle, the median particle diameter, bulk density and swelling time were measured. The results obtained are shown in Table 3.

Example 6

41 g of the alkyl-modified carboxyl group-containing polymer particle in the form of a fine white powder as obtained in the same manner as in Example 4 was spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 80° C. and a relative humidity of 80% for 1 minute, whereupon a moisture content of 8% by weight was attained. The resulting product was dried at 80° C. for 2 hours and then ground using a pin mill type grinder (trade name: Fine Impact Mill, manufactured by Hosokawa Micron Corporation), and the thus-obtained granular alkyl-modified carboxyl group-containing polymer particles were classified using a sieve with a mesh size of 1000 μm to remove coarser particles, whereby 39 g of the granular alkyl-modified carboxyl group-containing polymer particle as adjusted in particle size was obtained.

For the thus-obtained granular alkyl-modified carboxyl group-containing polymer particle, the median particle diameter, bulk density and swelling time were measured. The results obtained are shown in Table 3.

Comparative Example 5

41 g of the alkyl-modified carboxyl group-containing polymer particle in the form of a fine white powder as obtained in the same manner as in Example 4 was spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 30° C. and a relative humidity of 20% for 360 minutes, whereupon a moisture content of 3% by weight was attained. The resulting product was dried at 80° C. for 2 hours and then ground using a pin mill type grinder (trade name: Fine Impact Mill, manufactured by Hosokawa Micron Corporation), and the thus-obtained granular alkyl-modified carboxyl group-containing polymer particles were classified using a sieve with a mesh size of 1000 μm to remove coarser particles, whereby 40 g of the granular alkyl-modified carboxyl group-containing polymer particle as adjusted in particle size was obtained.

For the thus-obtained granular alkyl-modified carboxyl group-containing polymer particle, the median particle diameter, bulk density and swelling time were measured. The results obtained are shown in Table 3.

Comparative Example 6

41 g of the alkyl-modified carboxyl group-containing polymer particle in the form of a fine white powder as obtained in the same manner as in Example 4 was spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 30° C. and a relative humidity of 75% for 10 minutes, whereupon a moisture content of 4% by weight was attained. The resulting product was dried at 80° C. for 2 hours and then ground using a pin mill type grinder (trade name: Fine Impact Mill, manufactured by Hosokawa Micron Corporation), and the thus-obtained granular alkyl-modified carboxyl group-containing polymer particles were classified using a sieve with a mesh size of 1000 μm to remove coarser particles, whereby 40 g of the granular alkyl-modified carboxyl group-containing polymer particle as adjusted in particle size was obtained.

For the thus-obtained granular alkyl-modified carboxyl group-containing polymer particle, the median particle diameter, bulk density and swelling time were measured. The results obtained are shown in Table 3.

Comparative Example 7

41 g of the alkyl-modified carboxyl group-containing polymer particle in the form of a fine white powder as obtained in the same manner as in Example 4 was spread thinly and uniformly on a stainless steel dish with a diameter of 35 cm, and the whole was allowed to stand in a thermohygrostat (model: LH30-11M, manufactured by Nagano Science Co., Ltd.) adjusted to a temperature of 30° C. and a relative humidity of 90% for 180 minutes, whereupon a moisture content of 28% by weight was attained. The resulting product was dried at 80° C. for 2 hours and then ground using a pin mill type grinder (trade name: Fine Impact Mill, manufactured by Hosokawa Micron Corporation), and the thus-obtained granular alkyl-modified carboxyl group-containing polymer particles were classified using a sieve with a mesh size of 1000 μm to remove coarser particles, whereby 36 g of the granular alkyl-modified carboxyl group-containing polymer particle as adjusted in particle size was obtained.

For the thus-obtained granular alkyl-modified carboxyl group-containing polymer particle, the median particle diameter, bulk density and swelling time were measured. The results obtained are shown in Table 3.

Comparative Example 8

15 kg of the alkyl-modified carboxyl group-containing polymer particle in the form of a fine white powder as obtained in the same manner as in Example 4 was granulated in the manner of compression molding granulation. The compression molding apparatus used was Pharma Impactor (model: CS-25, manufactured by Hosokawa Micron Corporation). The particles were compression-molded by compression between two rolls (roll diameter: 230 mm, roll distance: 1.2 mm, number of roll revolutions: 5 rpm, compression molding pressure: 0.15 T/cm$^2$). The subsequent grinding (apparatus used: Fine Impact Mill, manufactured by Hosokawa Micron Corporation) and classification gave 13.3 kg of the compression-molded granular alkyl-modified carboxyl group-containing polymer particle.

For the thus-obtained compression-molded granular alkyl-modified carboxyl group-containing polymer particle, the median particle diameter, bulk density and swelling time were measured. The results obtained are shown in Table 4.

Reference Example 2

For the alkyl-modified carboxyl-group containing polymer particle in the form of a fine white powder as obtained in the same manner as in Example 4, the bulk density and swelling time were measured and the median particle diameter was measured using a laser diffraction type particle size distribution measuring apparatus (model: SALD-2000J, manufactured by Shimadzu Corporation, disperse media: normalhexane). The results obtained are shown in Table 3.

TABLE 3

|  | Example4 | Example5 | Example6 | Comparative Example5 | Comparative Example6 | Comparative Example7 | Reference Example2 |
|---|---|---|---|---|---|---|---|
| Temperature | 30° C. | 50° C. | 80° C. | 30° C. | 30° C. | 30° C. | — |
| Humidity | 75% RH | 80% RH | 80% RH | 20% RH | 75% RH | 90% RH | — |
| Time for standing in thermo-hygrostat | 180 min | 15 min | 1 min | 360 min | 10 min | 180 min | — |
| Moisture content after standing | 16% by weight | 14% by weight | 8% by weight | 3% by weight | 4% by weight | 28% by weight | — |
| Median particle diameter | 510 μm | 550 μm | 560 μm | <106 μm | <106 μm | 610 μm | 10 μm |
| Bulk density | 0.52 g/ml | 0.52 g/ml | 0.53 g/ml | 0.15 g/ml | 0.16 g/ml | 0.56 g/ml | 0.12 g/ml |
| swelling time | 20 min | 16 min | 17 min | ≧120 min | ≧120 min | 105 min | ≧120 min |

TABLE 4

|  | Example 4 Method of present invention | Comparative Example 8 Compression molding |
|---|---|---|
| Method for granulating | | |
| Median particle diameter | 510 μm | 560 μm |
| Bulk density | 0.52 g/ml | 0.39 g/ml |
| swelling time | 20 min | ≧120 min |

The results shown in Table 3 and Table 4 indicate that the granular alkyl-modified carboxyl group-containing polymer particles as obtained by the method for producing of the present invention have a high bulk density and swell in water in a short period of time.

INDUSTRIAL APPLICABILITY

The method for producing of the present invention makes it possible to obtain granular carboxyl group-containing polymer particles which hardly form undissolved lumps, have an excellent swelling property in water, hardly cause dusting and are thus superior in handleability as compared with carboxyl group-containing polymer particles in fine powder form. By swelling the granular carboxyl group-containing polymer particles obtained by the method for producing of the present invention in water and then neutralizing the solution with an alkali such as sodium hydroxide and triethanolamine, it is possible to obtain a neutralized viscous liquid excellent in surface smoothness, thickening property and transparency in a short period of time.

The invention claimed is:

1. A method for producing a granular carboxyl group-containing polymer particle, which comprises:
    producing carboxyl group-containing polymer particles by carrying out a reaction for producing a carboxyl group-containing polymer in a reaction mixture and then heating the reaction mixture to a temperature in a range of 80° C. to 130° C. so as to produce the carboxyl group-containing polymer particles,
    preparing an aggregate of the carboxyl group-containing polymer particles by providing the carboxyl group-containing polymer particles with moisture so that the carboxyl group-containing polymer particles absorb the moisture in an amount of 5 to 25% by weight and form the aggregate,
    drying the aggregate of the carboxyl group-containing polymer particles, and
    then grinding the dried aggregate.

2. The method for producing a granular carboxyl group-containing polymer particle according to claim 1,
    wherein the carboxyl group-containing polymer particle is a crosslinking carboxyl group-containing polymer particle produced by polymerizing an α,β-unsaturated carboxylic acid and a compound containing two or more ethylenically unsaturated groups in an inert solvent in the presence of a radical polymerization initiator.

3. The method for producing a granular carboxyl group-containing polymer particle according to claim 1,
    wherein the carboxyl group-containing polymer particle is an alkyl-modified carboxyl group-containing polymer particle produced by polymerizing an α,β-unsaturated carboxylic acid and a (meth)acrylic acid alkyl ester containing an alkyl group of 10 to 30 carbon atoms in an inert solvent in the presence of a radical polymerization initiator.

4. The method for producing a granular carboxyl group-containing polymer particle according to claim 1,
    wherein in the preparing step of the aggregate of the carboxyl group-containing polymer particles, the carboxyl group-containing polymer particles are maintained in an atmosphere having a temperature of 25 to 100° C. and a relative humidity of no lower than 30% but lower than 100%.

5. A granular carboxyl group-containing polymer particle produced by the method according to claim 1,
    which has the following characteristics:
    1) a median particle diameter of 300 to 800 μm,
    2) a bulk density of no lower than 0.30 g/mL and
    3) a swelling time of no longer than 30 minutes is required for all the granular carboxyl group-containing polymer particles to swell when the granular carboxyl group-containing polymer particles in an amount of 0.5% by weight relative to water are placed in water at 25° C.

6. The method for producing a granular carboxyl group-containing polymer particle according to claim 4,
    wherein the step of providing the aggregate of the carboxyl group-containing polymer particles with the moisture is performed by maintaining the carboxyl group-containing polymer particles in the atmosphere in a state of stand.

* * * * *